Patented Dec. 24, 1935

2,025,642

UNITED STATES PATENT OFFICE 2,025,642

ARYLATED ESTERS AND SYNTHETIC RESINOUS COMPOSITIONS

Merlin Martin Brubaker, Wilmington, Del., assignor to E. I. du Pont de Nemours & Company, Wilmington, Del., a corporation of Delaware No Drawing. Application March 21, 1932,
Serial No. 600,366

10 Claims. (Cl. 260—8)

This invention relates to new arylated products and more particularly to resinous materials improved by arylation.

Many types of polyhydric alcohol-polybasic acid resins are known and used in the arts, as in the protective coating, molding plastic, impregnation, and other fields. Notable among these resins are those in which fatty oils (or their acids) and natural acidic gums (or their esters) have been used as modifying agents. The polyhydric alcohol-polybasic acid resins in general, however, show several undesirable features. Some have poor water resistance; some have poor solubilities; some are too hard and others too soft for the purposes intended; still others, where applied to a surface in a thin film as a protective coating, eventually will chip, flake, and peel from the surface, or fail in some other way, as by "blistering" or "whitening". The utility of the resins in question in the arts can be ascribed, at least partially, to their hardening action, which in turn is due to one or more of the following: (1) simple thermoplasticity (solidifiation on cooling); (2) the formation of an infusible, insoluble product by the prolonged application of heat and/or pressure; (3) oxidation. The latter of these, viz. oxidation, presumably plays an important role when resins modified by fatty oils and/or natural gums are used as coating compositions. According to accepted theories, the oxidation takes place, chemically speaking, at the ethylenic linkages or other unsaturated points within the resin molecules. I believe that the eventual failure of films of these resins is closely connected with excessive oxidation, i. e. slow but continual oxidation beyond that point necessary to form a hard, tough film. The poor film characteristics of natural resins and their esters (as rosin and ester gums) is likewise believed to be due in a large measure to similar degradative oxidation changes which cause cracking, blistering and flak'ng of the finish on exposure to weathering. This oxidation presumably takes place, chemically speaking, at certain unsaturated linkages within the natural resin, such as the ethylenic linkage. While I have obtained markedly improved products by proceeding on the theory that complete or partial elimination of this unsaturation by arylation will arrest oxidation and thereby cause greater film durability, I do not desire to be limited to any theory that may be used to explain the facts of my invention.

This invention has as an object new arylated compositions of matter. A further object is the production of resins, particularly polyhydric alcohol-polybasic acid resins, the films of which are highly resistant to the destructive effects of oxidation. Other objects will appear hereinafter.

The arylated natural resins which I have found to be valuable ingredients of synthetic resins of the polyhydric alcohol-polybasic acid type are preferably made by reacting the resin or gum with the arylating agent, such as xylene, in the presence of aluminum chloride or other suitable anhydrous metallic chloride. In carrying out the arylation, it is preferred to use equimolecular proportions of aluminum chloride and the gum to be arylated. Where the average molecular weight of the gum is unknown, it is usually satisfactory to use aluminum chloride in an amount equal to from one-third to one-half by weight of the gum. A volume of arylating agent of 1200–1500 cc. per gram mol of the gum (or for every 300–350 grams if the molecular weight is unknown) has been found to furnish a sufficient quantity for both the arylation and the solvent medium. The process of arylation is carried out as follows: The natural resin is dissolved in the total quantity of hydrocarbon (arylating agent plus the excess used as the solvent medium) in a large vessel fitted with a stirrer, thermometer and reflux condenser. The equipment should be such that it will not be attacked by hydrochloric acid. The hydrocarbon solution of the gum is warmed to a temperature of about 50° C. The aluminum chloride is introduced cautiously in small portions with stirring or frequent shaking, about one hour usually being required for its addition. A vigorous reaction takes place, accompanied by considerable darkening in color. When all the aluminum chloride is added, the mixture is warmed on a water bath to 70–80° C. for about one and one-half hours. At the end of this period, the intermediate product formed with the aluminum chloride is decomposed with 20% hydrochloric acid (900–1000 cc. per gram mol). The acid is added cautiously in small portions with stirring or vigorous shaking until the initial reaction subsides; it is frequently desirable to cool the reaction vessel at first. All of the oil and tar should decompose completely. Cold water is added to bring the final volume to about four liters (per gram mol). The hydrocarbon layer is then separated from the water layer and washed repeatedly with cold water until nearly free of hydrochloric acid. The excess hydrocarbon is distilled off, the last traces being removed preferably at reduced pressure, leaving the desired arylated gum behind. This product is different from the original gum, to a more or less marked degree, in both physical and chemical properties. Both the iodine number and the acid number (if acidic originally) are lower. The product also has a different softening point and a different degree of hardness and thermoplasticity from the original gum. If the average molecular weight, degree of unsaturation, and acid value of the original gum are known, the final acid value will give a rough index to the extent of the arylation, provided the gum is acidic in nature. I have found that usually the higher the molecular weight of the arylating compound, the greater will be the thermoplasticity of the final product and also the lower its softening point. Pure hydrocarbons up to the xylols will form more or less friable products, depending upon the consistency of the original gum, but I have found that mixtures of hydrocarbons, such as those found in the commercial aromatic solvent naphthas, form softer and lighter-colored products, especially if the naphtha has a high boiling point and/or a wide boiling range. It may be that the mixture of aryl derivatives so obtained causes the lowering of the softening point. I have found the arylated resins and their esters to be less susceptible than the original material to atmospheric oxidation. Furthermore, there is little difference in oxygen absorption between the various types of arylated gum such as phenyl, tolyl, or xylyl, the increase in weight of the film being about the same as that of the unarylated material in an atmosphere of nitrogen. It appears that this decreased tendency toward oxidation is a contributing factor to the greater durability of varnishes and pyroxylin lacquers made with arylated gums.

The following examples in which the parts are by weight illustrate more specifically the method of making these arylated natural resins:

EXAMPLE I

*Phenyl abietic acid*

Three hundred thirty-five (335) parts of crude abietic acid is dissolved in 1320 parts of benzene by warming to about 45° C. under a reflux condenser. One hundred thirty-three (133) parts anhydrous aluminum chloride is then added in small portions over a period of 30-45 minutes. When addition of the aluminum chloride is complete, the solution is refluxed for thirty minutes, then allowed to cool to room temperature. The intermediate is decomposed with 1050 parts hydrochloric acid (20% HCl by weight), added in small portions. After several hours' standing the aqueous layer is siphoned out and the benzene layer washed several times with water, or until free of hydrochloric acid. The solvent is distilled off, the last traces being removed at 145° C. under 25 mm. pressure. The final product is a brittle rosin-like material of acid number 145.5 and iodine number 38, easily soluble in the usual rosin solvents. Films of this product absorbed 2.46% of their weight from the atmosphere after 64 hours at 65° C., while the original unarylated abietic acid absorbed 12.02% of its weight from the atmosphere and 2.15% of its weight from an atmosphere of nitrogen, under the same conditions. When blended with oils by heating in the usual way, a varnish is obtained films of which show unusual durability and do not crack or peel on aging as badly as those of the corresponding varnishes made with ordinary rosin.

EXAMPLE II

*Tolyl ester gum*

Three hundred fifty (350) parts ester gum is dissolved in 1300 parts toluene by warming to a temperature of about 45° C. under a reflux condenser. Granular, anhydrous aluminum chloride is introduced in portions of 3-5 parts until 135 parts has been added; about thirty minutes is required. The solution is refluxed for 1½ hours, then allowed to cool to room temperature. Nine hundred ninety (990) parts 20% hydrochloric acid is added cautiously with rapid stirring. After several hours' standing, the aqueous layer is discarded and the toluol solution of tolyl ester gum washed with water until free of hydrochloric acid. The toluol is then distilled off, the last traces being removed in vacuo at 145° C. The product is a fairly hard, thermoplastic material, somewhat friable at room temperature, and easily soluble in the usual ester gum solvents. Films of the tolyl ester gum absorb much less oxygen than do those of ordinary ester gum.

EXAMPLE III

*Aryl Rosin*

Three hundred thirty-five (335) parts crude abietic acid is dissolved in 1320 parts "Hi-flash" naphtha by warming to about 45° C. under a reflux condenser. Granular, anhydrous aluminum chloride is introduced in small portions, until 133.5 parts has been added; some thirty minutes is usually required. The mixture is now refluxed gently for 1½ hours, then allowed to cool to room temperature. One thousand fifty (1050) parts 20% hydrochloric acid is added cautiously, with efficient agitation. After several hours' standing the resin solution is separated from the aqueous layer, washed with water repeatedly, and subjected to distillation, the final traces of the excess Hi-flash naphtha being removed at 145° C. under 25 mm. pressure. The product is a rather soft, sticky mass, dark amber in color, and much more thermoplastic than the phenyl rosin obtained in Example I. It shows an acid number of 85-88 and is easily soluble in aromatic hydrocarbon solvents. The Hi-flash naphtha used in this example is a mixture of aromatic hydrocarbons, boiling about 150-200° C. About 5% naphthalene is usually present in the mixture.

Natural acidic gums other than rosin and derivatives of these gums other than rosin glyceride (ester gum) can likewise be arylated. The only requirement for arylation is that the gum or its derivative shall be unsaturated at some point. This unsaturation may take one or more of several forms, the exact nature of which is not known, and may be difficult to detect. Unsaturated groupings are presumably unaffected by esterification and are therefore present unaltered in the ester gums. Practically all the natural gums are believed to be unsaturated to a greater or less degree, and can therefore be arylated. Among these gums may be mentioned such natural resins as rosin, Kaurio, Congo, Manila, Sandarac, Damar, Pontianac, Sierra Leone, and Zanzibar. Frequently it is desirable first to depolymerize the gum partially by heating; such treated gums are generally referred to, for example, as "run Congo". I may also arylate any unsaturated product which has been obtained or separated from the gum without affecting its unsaturation, as for example abietic acid.

The ester gums, which can also be arylated, are generally formed by treating natural acidic resins with substances such as polyhydric alcohols (glycerol, the glycols), monohydric alcohols (ethyl alcohol) or even chlorhydrins (ethylene chlorhydrin). Derivatives of natural gums which can be arylated and which fall within the term resin or gum as used herein will therefore include all those derivatives in which any or all of the chemical groups, other than those containing the double bond or bonds between carbon atoms, are replaced, modified, or added to. The carboxyl group is one such additional group. As specific examples of these derivatives I have rosin glyceride, ethyl abietate, Congo glycolide, and lime-hardened rosin. Oxidized and hydrogenated gums, however, cannot be arylated.

The term "aryl" applies to any aromatic hydrocarbon residue, i. e. any aromatic hydrocarbon less one nuclear hydrogen atom. This includes the homologs of benzene, such as toluol, xylol, mesitylene, cymene, ethyl benzene, and other alkyl benzenes, also polynuclear hydrocarbons, such as diphenyl and naphthalene, less one nuclear hydrogen atom. Mixtures of these hydrocarbons, such as that known commercially as "Hi-flash" naphtha may also be used. The term "aryl" as used herein also includes aromatic ethers such as anisol, phenetol and diphenyl ether. By using materials of this nature alkoxy or aryloxy aryl groups instead of simple aryl groups may be introduced into the natural resin or ester gum. Phenols, sulfonic acids, amines, etc. are, however unsuitable.

By the terms "arylated", as used in the present specification and claims to describe various products, is meant a compound into which an aryl group has been introduced by means of a Friedel-Craft reaction at an ethylenic double bond or other form of unsaturation present in the compound prior to this treatment.

Catalysts other than aluminum chloride which are known to be useful in carrying out the Friedel-Craft type reaction may be used in arylating the resins in the present process. Other useful metallic chlorides are ferric chloride, titanium chloride and zinc chloride.

Various changes may be made in the above described process for arylating the resins. Thus, the heat treatment after the addition of the aluminum chloride may be omitted or increased to 3-5 hours, depending on the ease with which the reaction proceeds. It also may be carried out at a temperature lower than that specified (70-80° C.) for a longer period of time, or at the higher temperature for a shorter time, the latter of course depending on the boiling point of the arylating agent. Proportions of catalyst may be varied, as for example in the range of 0.1 mol-2.0 mols, per mol of gum. The addition of the aluminum chloride may be carried out in the cold or at temperatures above 50° C., depending upon the ease with which the addition compound is formed. This addition compound may be decomposed with other acids than hydrochloric, such as sulfuric and possibly acetic.

Other arylated products which are valuable ingredients of polyhydric alcohol-polybasic acid resins are arylated fatty acid esters, especially esters of polyhydric alcohols, such as drying oils. The arylation of such esters depends of course upon the presence of ethylenic linkages in the fatty acid; such unsaturation is present in most fatty oils. These arylated oils are prepared with minor variations in the same manner as the arylated natural resins, the preferred proportions of materials being three mols of aluminum chloride to one mol of oil. The product obtained is markedly different from the original oil. The iodine number is lower, and the oil is also more viscous. The saponification number frequently rises somewhat, which may possibly be ascribed to the presence of a small amount of saponification halogen. In most of these arylated oils, a test with silver nitrate for water-soluble halides (i. e. hydrochloric acid) is negative, while an alkali fusion test is positive. I have found that in practice about 90% of the excess solvent is recoverable. The method of making these arylated drying oils is shown in more detail in the following three examples:

EXAMPLE IV

Phenyl linseed oil

Three hundred fifty (350) parts alkali-refined linseed oil (iodine number 175, saponification number 191.5) is dissolved in 1320 parts benzene and the mixture heated to boiling in a vessel fitted with a reflux condenser. Anhydrous aluminum chloride is added cautiously in small portions with stirring until 135 parts has been introduced. The mixture is then refluxed for 1½ hours. After cooling to room temperature, the intermediate compound is decomposed with 1050 parts 20% hydrochloric acid. The heat of the reaction at first causes the benzene to boil gently. The boiling gradually subsides as more acid is added. All of the tarry material decomposes completely on standing for a short while in contact with the acid. The benzene layer is separated and washed several times with water to which a small amount of sodium chloride has been added to assist in breaking the emulsion. The benzene is finally removed by distillation, the last traces preferably at reduced pressure (25 mm.). It is not necessary to dry the benzene solution before distillation. The phenyl linseed oil, which may contain some saponified material, remains behind as a dark viscous oil of iodine number 70, and saponification number 260.8. Yield 365 parts phenyl linseed oil. A test for soluble halides is negative.

EXAMPLE V

Tolyl cottonseed oil

Three hundred fifty (350) parts cottonseed oil (iodine number 112.5 and saponification number 194) is dissolved in 1300 parts toluol in a vessel fitted with a thermometer and water-cooled reflux condenser. Anhydrous aluminum chloride is added cautiously in small portions with stirring or frequent shaking until 135 parts has been introduced; about 45 minutes is required. The reaction is more vigorous than in the case of phenyl linseed oil, and considerable darkening takes place. The mixture is then refluxed for 1½ hours (110-115° C.). After cooling to room temperature or below, the intermediate compound is decomposed with 1050 parts 20% hydrochloric acid, added cautiously at first in small portions. This reaction is quite rapid and is accompanied by the copious evolution of hydrogen chloride. Complete decomposition takes place, no tarry material remaining. The toluol solution is separated and washed several times with water to which a little sodium chloride may be added. The toluol (and a small amount of water) is removed by distillation, the last traces at a temperature of 190° C. and a pressure of 25 mm. The material is finally blown gently for a few minutes with carbon dioxide. The yield of tolyl cottonseed oil is 418 grams. The product has an iodine number of 19.7, a saponification number of 252, and shows a negative test for soluble halides.

EXAMPLE VI

Xylyl ethyl stearate

Xylyl ethyl stearate may be prepared by reacting xylol with the ethyl ester of oleic acid in the presence of aluminum chloride as the catalyst and excess xylol as the solvent.

|  | Parts |
|---|---|
| Ethyl ester oleic acid | 310 |
| Aluminum chloride | 135 |
| Xylol | 1340 |

The procedure is essentially the same as in Examples IV and V. The product can be used as a dispersing agent.

In the arylation of fatty acid esters, some hydrolysis may take place, resulting in a small amount of arylated fatty acids mixed with the arylated fatty acid ester. A neutral product can be obtained in such cases by heating with glycerol or other alcohol.

Among the fats and oils which can be arylated I may mention the following: linseed oil, Chinawood oil, soya bean oil, rapeseed oil, menhaden oil, perilla oil, cottonseed oil, sardine oil, rubber seed oil, safflower oil, sperm oil, walnut oil, etc. I prefer to arylate the raw oil since blowing, bodying or hydrogenation tends to affect the double bond, which is presumably the point where arylation takes place. In addition I may arylate alkyl, alkoxyalkyl, aryl, alkoxyaryl, aryloxyalkyl, and aryloxyaryl esters of unsaturated fatty acids, e. g., methyl oleate, ethyoxy ethyl erucate, benzyl eleostearate, dibenzylin elaidate, tolyloxyethyl linolenate, phenoxybenzyl ricinoleate, the butyl ester of linseed oil acids, etc.

The arylated natural resins, arylated ester gums, and the arylated fatty acid esters, especially the arylated fatty oils, can be used alone, blended with each other, or blended with ordinary unarylated gums and fatty oils in the manufacture of coating compositions of improved properties. However, these arylated materials find their greatest utility as ingredients of polyhydric alcohol-polybasic acid resins, as is more fully described hereinafter.

While my preferred products, the arylated polyhydric alcohol-polybasic acid resins, may be obtained by the arylation of the preformed resin (provided one or more of its ingredients originally possessed ethylenic linkages or other form of unsaturation), I prefer, because of probable undesirable hydrolysis, to make these improved synthetic resins by using one or more of the previously described arylated materials, as well as certain known arylated substances, in the synthesis of the resin. Polyhydric alcohol-polybasic acid resins are made, as is well understood to those skilled in the art, by suitable heat treatment of a polyhydric alcohol and a polybasic acid with or without one or more of various modifying agents such as fatty acids, fatty oils, resins, monobasic acids, monohydric alcohols (including ether alcohols), etc. In accordance with the present invention one or more of these resin ingredients is arylated prior to its incorporation into the resin reaction mixture, an essential requirement being that the ingredient selected for arylation must possess the chemical nature which renders it capable of arylation. In some instances the necessary unsaturation may be in other forms than ethylenic linkages, such as "bridged" or other types of ring structures, and may be more or less difficult to detect, as by iodine number; the exact nature of the natural gums (and hence their esters), for example, is by no means well understood.

In making the arylated synthetic resins the ingredients may be heated at any suitable temperature above their mixed melting point until resinification takes place. An atmosphere of an inert gas tends to produce lighter-colored products, and efficient agitation materially speeds up the process. Where an arylated fatty oil, or an unarylated fatty oil in connection with some other arylated ingredient, is used, it is desirable, in order to obtain a homogeneous product, to heat the oil and polyhydric alcohol together in the presence of an alcoholysis catalyst, such as litharge, before adding the remaining ingredients. In this preliminary step, the mono and/or di-glycerides (or similar esters of other polyhydric alcohols) are obtained; if the oil is arylated, such products are also arylated fatty acid esters. It is desirable to carry the acid number as low as possible while still maintaining the resin in the fusible, soluble state. However, prolonged heating which causes only a very small change in acid number is undesirable as it tends to increase substantially the body of the resin and to impart a high viscosity to solutions of the product. Inasmuch as different requirements are presented by such factors as the nature and amount of the monovalent modifying agents present (arylated or unarylated), the nature of the oil, polybasic acid, and polyhydric alcohol, the variation from stoichiometrical proportions of ingredients, etc., it is not possible to give a rigid heat schedule which will be applicable in all cases. A close approximation to a general procedure is to carry the ingredients to a temperature of about 225° C. over a period of about one hour and to continue the heat treatment at this point until that acid number found or calculated to give the optimum fusibility, solubility and viscosity characteristics for that particular resin is reached.

The following examples, in which the parts are by weight, illustrate the preparation of my arylated polyhydric alcohol-polybasic acid resins:

EXAMPLE VII

Use of an arylated simple fatty acid as a resin ingredient

Seventy-one and four-tenths (71.4) parts phenyl stearic acid (prepared from oleic acid, benzene, and aluminum chloride), 42.8 parts glycerol and 8.58 parts phthalic anhydride are heated with stirring in an open aluminum vessel to a temperature of 25° C. over a period of one hour. The mixture is held at this point one and one-half hours and the heat then removed. The resin thus obtained is preferably thinned with Hi-flash naphtha when it has cooled to about 175° C. The solid product is a clear, dark brown resin, slightly sticky, very tough, and shows an acid number of 29. Films of this resin do not bloom on aging as do those of the corresponding resin prepared from stearic acid.

EXAMPLE VIII

Use of an arylated natural acidic gum as a resin ingredient

Three hundred twenty-three and eight-tenths (323.8) parts phthalic anhydride, 180.2 parts phenyl abietic acid (product of Example I), 183.2 parts glycerol, and 312.8 parts linseed oil acids are fused in an open aluminum vessel to a temperature of about 220° C. over a period of about one and one-half hours, the temperature then being maintained at the latter point for five hours. The final resin is a soft, dark brown, sticky mass, which will flow but not pour, of acid number 18-19. Films of this resin dry rapidly and have excellent durability on exposure to weathering.

EXAMPLE IX

*Use of an arylated ester of a natural acidic gum as the resin ingredient*

Twenty and eight tenths (20.8) parts glycerol, 35.4 parts tolyl ester gum (product of Example II), and 43.8 parts phthalic anhydride are heated and stirred in an open aluminum vessel being carried to a temperature of 210° C. over a period of 30 minutes. The mixture is clear and homogeneous as soon as it reaches this point. Heating is then continued at 210° C. for five hours. The final product is a dark, rubbery resin of acid number 61.

EXAMPLE X

*Use of arylated fatty oil acids as the resin ingredient*

Forty-four and four-tenths (44.4) parts glycerol, 62.6 parts tolyl linseed oil acids (prepared in the usual manner from linseed oil acids, toluene, and aluminum chloride) and 83.0 parts phthalic anhydride are heated in an open aluminum vessel at a temperature of 210° C. over a period of 30 minutes. The mixture is clear as soon as it reaches this temperature. Some foaming is observed at this point. Heating is continued at 205° C. for about 2½ hours after which the resin is removed from the fire and thinned while hot with an aromatic solvent naphtha. The acid number of the solid resin is about 65. This product, being moderately dark, can only be used in varnishes and lacquer where a light color is not required. Films are hard, tough and durable.

EXAMPLE XI

*Use of an arylated fatty oil as the resin ingredient*

Twenty-two and eight-tenths (22.8) parts glycerol and 27.1 parts of tolyl cottonseed oil (product of Example V) are heated together at 200° C. for about 30 minutes by which treatment a homogeneous, neutral ester of tolyl cottonseed oil is obtained in which excess glycerol is present. At this point 50.1 parts phthalic anhydride is added to the hot mass and the temperature again raised to 200° C. The mixture is held at this temperature for 2 hours, the heat then being removed and the product thinned while hot with an aromatic solvent naphtha. Before thinning a test portion, the resin was a medium brown colored product, soft and sticky, of acid number about 55. This resin is especially suitable for the preparation of durable nitrocellulose lacquers.

EXAMPLE XII

*Use of a mixture of an arylated fatty oil and arylated fatty oil acids as the resin ingredient*

Twenty-one and six-tenths (21.6) parts glycerol, 31.7 parts of the product of Example IV (which is a mixture of phenyl linseed oil and phenyl linseed oil acids) and 46.7 parts phthalic anhydride are heated simultaneously in an open vessel with stirring to a temperature of 210° C. over a period of 30 minutes. The temperature is held at this point for one hour, the heat removed and the resin thinned while hot with an aromatic solvent naphtha.

The types of arylated materials, at least one of which is used as an ingredient in the preparation of my arylated polyhydric alcohol-polybasic acid resin, can be summarized as follows: arylated natural resins, arylated derivatives of natural resins (such as arylated ester gums), and arylated fatty acid esters, all of which have been described herein; arylated fatty acids or fatty acid mixtures such as phenyl stearic acid (from oleic acid and benzene), and the xylyl, tolyl, etc., derivatives of fatty oil acids, e. g. tolyl linseed oil acids, xylyl China wood oil acids, mesityl cottonseed oil acids, etc., and a few others which are less desirable and more difficult to obtain, such as various aryl derivatives of unsaturated polyhydric alcohols and polybasic acids (conylene glycol, muconic acid and aconitic acid).

The non-arylated ingredients of my new resins may be any of those conventionally used in the manufacture of polyhydric alcohol-polybasic acid resins. Polybasic acids, other than phthalic anhydride may include such acids as succinic, adipic, sebacic, maleic, itaconic, tartaric, citric, dilactylic, thio-dilactylic, salicyl-acetic, chlorophthalic, diphenic, pyromellitic, and naphthalic. Suitable polyhydric alcohols in addition to glycerol are ethylene glycol and higher homologs, diethylene glycol and other polyglycols, polyvinyl alcohol, polyglycerol, triethanolamine, pentaerythritol, and alkyl and aryl ethers of polyhydric alcohols having at least two hydroxyl groups, such as monobenzylin and the diethyl ether of pentaerythritol. Other non-arylated resin ingredients are, broadly speaking, similar in chemical nature to the preferred types of arylated ingredients, that is, they are either esters, monohydric alcohols, or monocarboxylic acids. Under the term "ester" as used here, I include fatty oils such as linseed oil, cottonseed oil, castor oil; esters of natural acidic resins such as ester gum, Congo glycolide, and ethyl abietate; and other esters in general such as stearin, triacetin, butyl acetate, dibutyl tartrate and ethyl benzoate. By the term monohydric alcohol I mean alcohols such as amyl, benzyl and cyclohexyl; ether alcohols such as dibenzylin, ethoxy ethyl alcohol, etc.; and ester alcohols such as diacetin and butyl lactate. By the term "monobasic acid", I include pure monobasic acids such as stearic, oleic, butyric, lactic, salicylic, and benzoic; fatty oil acids, such as China wood oil acids, cottonseed oil acids, soya bean oil acids, and coconut oil acids; and natural acidic resins such as rosin, Kauri and Congo.

Various changes in the process of making the resins will readily occur to those skilled in the art. The process can be carried out in open or closed vessels of glass, enamel or of various metals such as iron, aluminum, or Monel, etc., with or without the presence of esterification catalysts, such as sulfuric acid, phosphoric acid, or various sulfonic acids. An atmosphere of an inert gas, such as nitrogen or carbon dioxide, tends to produce lighter-colored products. Mechanical agitation is highly advisable, and can be accomplished by stirring and/or by blowing with the inert gas, preferably by both. Reduced and increased pressures are at times advantageous. Auxiliary condensing systems, such as a short air-cooled reflux condenser, which permits the water of reaction to escape but retains for the most part any volatile resin ingredients, are often useful. As in my co-pending application Serial No. 421,585, filed January 17, 1930, I may also carry out the resinification in the presence of a solvent for the resin which is non-reactive toward the resin and the ingredients thereof and adjust the temperature of reaction (which is approximately the boiling point of the solvent) by applying various pressures to the system. In such cases, the combined vapors of the solvent and water of reaction can be conveniently passed through a downward condenser, the water then being separated from the solvent by chemical or mechanical means, and the latter returned continuously to the reaction vessel. Such non-reactive solvents are aromatic hydrocarbons or mixtures thereof, chlorobenzene, dichloroethyl ether, diethyl ether or glycol, menthane, etc.

My improved arylated polyhydric alcohol-polybasic acid resins possess characterics which make them valuable as protective coatings. For this purpose they may be used alone or combined by mutual solvents, heating, or other means, with one or more of the following: cellulose derivatives, such as nitrocellulose, benzyl cellulose, ethyl cellulose, cellulose butyrate, and cellulose acetopropionate; natural gums, such as rosin, Kauri, and Damar; esters of natural gums, such as ester gum and ethyl abietate; drying oils, such as linseed oil and China wood oil; other synthetic resins, such as phenol-formaldehyde, amino-aldehyde, and vinyl; bitumens, such as asphalt. To my products, either alone or mixed with one or more of the above substances, I may add driers, pigments, fillers, lakes, plasticizers, solvents, etc., as needed and desired. I may use any of the known methods of applying the finish, such as spraying, brushing, baking, air-drying, etc.

Other uses for my new products are binders, cements, etc. for general use; coating and impregnating agents for cloth, paper, wood pulp, porous stone, etc.; the sandwiching material or adhesive therefor in the manufacture of safety glass; sizing material; the binding agent for sheets or layers of mica, cellulose acetate, etc. in preparing insulating materials and laminated products; for linoleum plastics and molding plastics in general.

The new arylated natural resins hereinbefore described are not only useful as arylated constituents of polyhydric alcohol-polybasic acid resins but may in general be used to advantage for the same purposes as the arylated synthetic resins and are also particularly valuable as coating compositions when associated with ingredients of coating compositions such as are referred to in connection with the arylated polyhydric alcohol-polybasic acid resins.

The following are examples of coating compositions in which the arylated natural or synthetic resins described herein may be used:

Example XIII

*Lacquer from an arylated natural resin*

|  | Parts |
|---|---|
| Aryl rosin (product of Example III) | 8.4 |
| Ethyl cellulose | 8.4 |
| Butyl acetate | 11.8 |
| Ethyl acetate | 16.4 |
| Ethoxy ethyl acetate | 2.2 |
| Ethyl alcohol | 9.0 |
| Butyl alcohol | 4.7 |
| Toluol | 31.4 |
| Aliphatic hydrocarbons | 7.7 |
|  | 100.0 |

This lacquer shows a viscosity of 18.0 seconds at 25° C. in the No. 10 brass cup and contains equal parts of aryl rosin and ethyl cellulose. It has a greater durability of exposure to weathering than the corresponding lacquer made with ordinary rosin.

Example XIV

*Varnish from an arylated ester gum*

|  | Parts |
|---|---|
| Tolyl ester gum (product of Example II) | 11.0 |
| China wood oil | 33.8 |
| Linseed oil (alkali refined) | 3.8 |
| Mineral spirits | 48.5 |
| Cobalt linoleate solution (0.75%) | 2.9 |
|  | 100.0 |

The tolyl ester gum, linseed oil, and China wood oil are heated in an open vessel to 275° C. over a period of 25 minutes, then held at this point for twenty minutes. When the temperature has fallen to about 200° C. the mineral thinner is stirred in. Before use the cobalt linoleate is added to this solution. Further thinning may be necessary for spray application. This varnish shows less flaking, blistering and peeling than the corresponding varnish made with ordinary ester gum.

Example XV

*Lacquer from arylated polyhydric alcohol-polybasic acid resin*

|  | Parts |
|---|---|
| Resin of Example VIII | 18.0 |
| Nitrocellulose | 4.5 |
| Butyl acetate | 11.2 |
| Ethyl acetate | 11.3 |
| Cellosolve acetate | 1.2 |
| Ethyl alcohol | 5.8 |
| Butyl alcohol | 5.0 |
| Toluol | 27.0 |
| "Hi-flash" naphtha | 12.0 |
| Aliphatic hydrocarbons | 4.0 |
|  | 100.0 |

The above lacquer is conveniently prepared by dissolving the resin in the "Hi-flash" naphtha and the nitrocellulose in a mixture of the ethyl alcohol, cellosolve acetate, aliphatic hydrocarbons, and a part of the butyl and ethyl acetates, and thinning with a mixture of the remaining solvents and the rest of the butyl and ethyl acetates. This lacquer has a solids content of 22.5% and a viscosity of 19.6 seconds in the No. 10 cup at 25° C. Films applied over wood are unaffected after 200 days exposure to weathering.

The esters of arylated-unsaturated fatty acids previously described, as for instance arylated drying oils, are also valuable in themselves as well as being useful in making the resinous arylated polybasic acid esters of polyhydric alcohols. These arylated esters of unsaturated fatty acids may be used as softeners for cellulose derivatives, dispersing agents and may be combined with arylated or unarylated natural gums for use as varnishes, with or without unarylated oils. The arylated fatty acid esters are also useful as waterproofing agents for impregnation of textile fabrics, paper, stone, stucco, wall board, and porous materials of all kinds, and as water-repellent protective paint films for metal; for the latter purpose they may contain inert pigments such as titanium oxide or basic pigments such as zinc oxide.

In addition to the greater film durability of my arylated polyhydric alcohol-polybasic acid resins as compared to that of the corresponding unarylated resins, I have also found that the introduction of these aromatic nuclei, besides increasing the molecular weight of the resin, increase its solubility in aromatic hydrocarbons and its water resistance when exposed in films to weathering. Certain other advantages, such as is exemplified by the following, may also be noted: Films of resins in which an arylated stearic acid is used as a modifier (see Example VII) do not have the same tendency to "bloom" or exude stearic acid on aging as do films of the corresponding stearic acid modified resin. As a further example, when an arylated rosin is substituted in equivalent amounts for ordinary rosin as a modifying ingredient of polyhydric alcohol-polybasic acid resins, I obtain better durabilities without sacrificing desirable low viscosities characteristic of solutions of such resins modified by ordinary rosin.

As many apparently widely different embodiments of this invention may be made without departing from the spirit and scope thereof, it is to be understood that I do not limit myself to the specific embodiments thereof except as defined in the following claims:

I claim:

1. An organic composition containing in chemically combined form an arylated monocarboxylic acid radical, said composition being one that is obtained by reacting in the presence of an anhydrous metallic halide an aromatic hydrocarbon with a compound selected from the class consisting of natural resin acids, esters thereof and esters of unsaturated fatty acids.

2. The product obtained by treating an acidic natural resin with an aromatic hydrocarbon in the presence of aluminum chloride.

3. The product obtained by treating rosin with an aromatic hydrocarbon in the presence of aluminum chloride.

4. The product obtained by reacting a polyhydric alcohol ester of an acid from the class consisting of natural resin acids and unsaturated fatty acids with an aromatic hydrocarbon in the presence of aluminum chloride.

5. The product obtained by reacting an unsaturated fatty oil with an aromatic hydrocarbon in the presence of aluminum chloride.

6. The product obtained by reacting linseed oil with an aromatic hydrocarbon in the presence of aluminum chloride.

7. A resinous polyhydric alcohol ester of a mixture of acids comprising a polycarboxylic acid and an acid obtained by reacting an acid of the class consisting of natural resin acids and unsaturated fatty acids with an aromatic hydrocarbon in the presence of aluminum chloride.

8. A resinous glycerol ester of a mixture of acids comprising phthalic acid and an acid obtained by reacting an acid of the class consisting of natural resin acids and unsaturated fatty acids with an aromatic hydrocarbon in the presence of aluminum chloride.

9. The product obtained by reacting an unsaturated fatty oil with an aromatic hydrocarbon in the presence of aluminum chloride, alcoholyzing with polyhydric alcohol, and heating with polycarboxylic acid until a resin is formed.

10. A process which comprises esterifying the product obtained by reacting in the presence of an anhydrous metallic halide an aromatic hydrocarbon with an acid selected from the class consisting of natural resin acids and unsaturated fatty acids.

MERLIN MARTIN BRUBAKER.